(12) United States Patent
Buchanan et al.

(10) Patent No.: US 11,232,352 B2
(45) Date of Patent: Jan. 25, 2022

(54) MEMRISTOR SPIKING ARCHITECTURE

(71) Applicant: HEWLETT PACKARD ENTERPRISE DEVELOPMENT LP, Houston, TX (US)

(72) Inventors: Brent Buchanan, Ft. Collins, CO (US); John Paul Strachan, San Carloa, CA (US); Le Zheng, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 546 days.

(21) Appl. No.: 16/037,060

(22) Filed: Jul. 17, 2018

(65) Prior Publication Data
US 2020/0026995 A1 Jan. 23, 2020

(51) Int. Cl.
*G06N 3/04* (2006.01)
*G06N 3/063* (2006.01)
*G06N 3/08* (2006.01)

(52) U.S. Cl.
CPC ............... *G06N 3/08* (2013.01); *G06N 3/049* (2013.01); *G06N 3/0635* (2013.01)

(58) Field of Classification Search
CPC .............................. G06N 3/049; G06N 3/0635
See application file for complete search history.

(56) References Cited

U.S. PATENT DOCUMENTS

| | | | |
|---|---|---|---|
| 6,242,988 B1 * | 6/2001 | Sarpeshkar | G06N 3/049 331/111 |
| 9,679,242 B2 | 6/2017 | Nugent et al. | |
| 10,340,002 B1 * | 7/2019 | Kim | G06N 3/084 |
| 10,453,528 B1 * | 10/2019 | Burr | G11C 13/0026 |
| 2010/0299297 A1 | 11/2010 | Breitwisch et al. | |
| 2015/0106314 A1 | 4/2015 | Birdwell et al. | |

(Continued)

FOREIGN PATENT DOCUMENTS

CN 107368888 11/2017

OTHER PUBLICATIONS

Chakma, Gangotree, et al. "Memristive mixed-signal neuromorphic systems: Energy-efficient learning at the circuit-level." IEEE Journal on Emerging and Selected Topics in Circuits and Systems 8.1 (2017): 125-136. (Year: 2017).*

(Continued)

*Primary Examiner* — Hal Schnee
(74) *Attorney, Agent, or Firm* — Nolte Lackenbach Siegel

(57) ABSTRACT

A circuit for a neuron of a multi-stage compute process is disclosed. The circuit comprises a weighted charge packet (WCP) generator. The circuit may also include a voltage divider controlled by a programmable resistance component (e.g., a memristor). The WCP generator may also include a current mirror controlled via the voltage divider and arrival of an input spike signal to the neuron. WCPs may be created to represent the multiply function of a multiply accumulate processor. The WCPs may be supplied to a capacitor to accumulate and represent the accumulate function. The value of the WCP may be controlled by the length of the spike in signal times the current supplied through the current mirror. Spikes may be asynchronous. Memristive components may be electrically isolated from input spike signals so their programmed conductance is not affected. Positive and negative spikes and WCPs for accumulation may be supported.

20 Claims, 8 Drawing Sheets

(56) References Cited

U.S. PATENT DOCUMENTS

| | | | |
|---|---|---|---|
| 2016/0042271 A1 | 2/2016 | Yoon et al. | |
| 2017/0255860 A1* | 9/2017 | Ritter | G06N 3/049 |
| 2017/0364793 A1* | 12/2017 | Kim | G11C 11/54 |
| 2018/0227551 A1* | 8/2018 | Shishido | H04N 9/045 |
| 2020/0019850 A1* | 1/2020 | Valentian | G06N 3/049 |

OTHER PUBLICATIONS

Shukla, A. et al.; "An On-chip Trainable and Clock-less Spiking Neural Network with 1r Memristive Synapses"; 2017; 10 pages.

* cited by examiner

MEMRISTOR SPIKING ARCHITECTURE

BACKGROUND

A neural network is an artificial network with an input layer, an output layer, and at least one hidden layer in between. A neural network receives inputs at a "neuron" processes those inputs with a weighting factor per input and produces a single output. Typically, processing within a neuron of a neural network is performed, at least in part, by a multiply accumulate function. There exist different architectures and types of neural networks with respect to circuitry used to implement processors of the neural network and timing of processing for layers of the neural network. A number of different timing models and signal representations exist for neural networks that include: synchronous neural networks, clock controlled spiking neural networks, and asynchronous (e.g., not clock controlled) spiking neural networks. In a spiking neural network, once a neuron produces a spike its value is cleared and waits for an accumulation of inputs to reach a next spiking threshold before producing another spike (and again resetting).

For a synchronous neural network, all outputs from a layer may be produced synchronously with each other. Thus, in a synchronous neural network each layer is simultaneously producing an output for the next layer and each layer may receive a next input and provide an output (from the previous input), for example, based on a clock cycle or a continuous feed of information. Note that layers of a neural network may not always provide their output to a next "lower" layer because some outputs may loop back and represent inputs to a previous layer, the same layer, or a distant "lower" layer. Not all neural network implementations are synchronous. For example, a spiking neural network may operate asynchronously (but some functionality may still may be synchronized with a clock for timing purposes). The asynchronous spiking neural network is asynchronous because a spike (i.e., output from a neuron) is created only upon reaching a spiking condition (e.g., a threshold value). Thus, at some points in time a neuron may not have an output because that neuron's spiking condition was not met by its current inputs (after weighting and processing). In some implementations of spiking neural networks, spikes representing output may be provided immediately upon determination of the spiking condition and not wait for a next input/output clock cycle (i.e., an asynchronous spiking neural network).

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
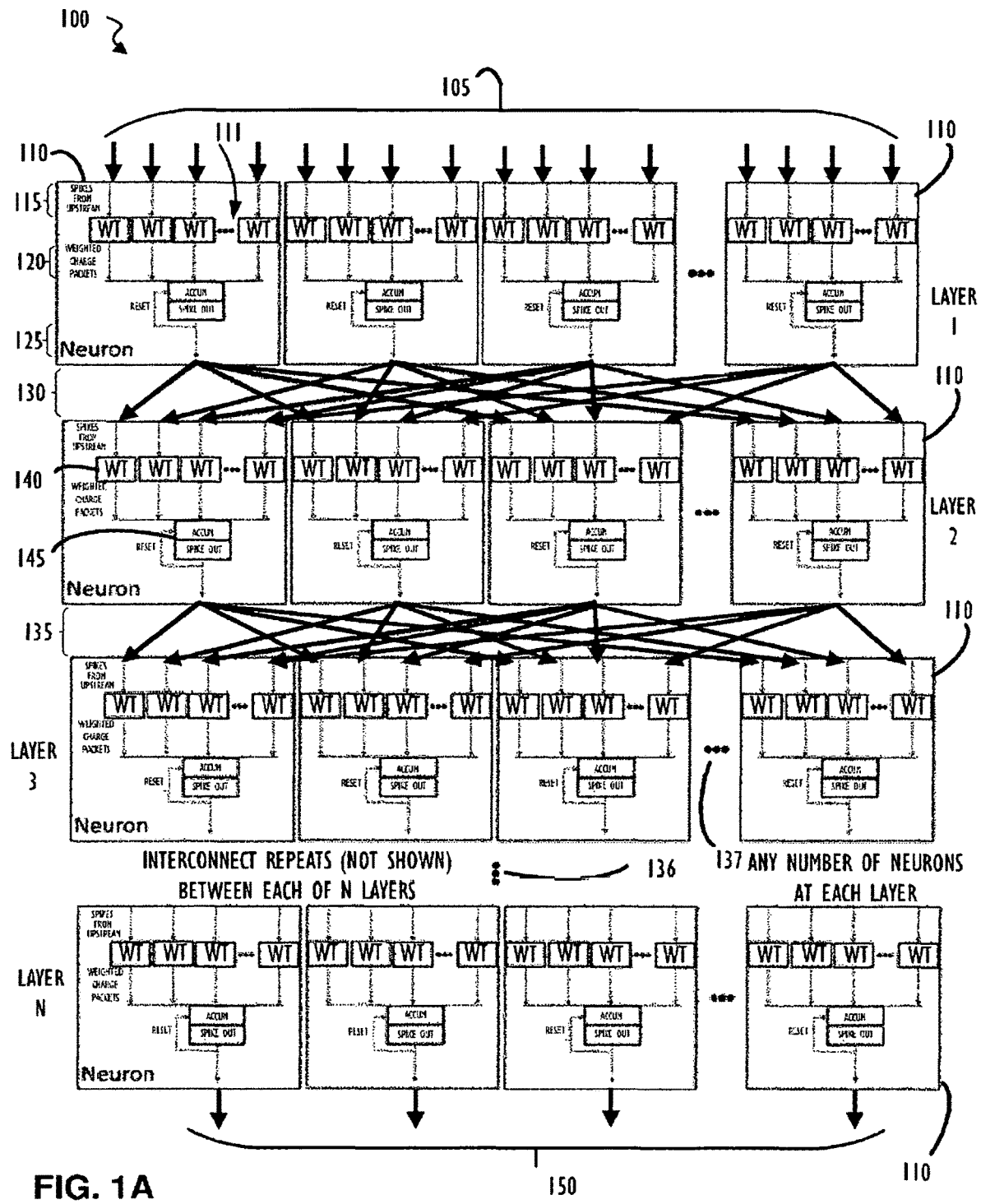
FIG. 1A is a block diagram representing one possible logical representation of a multi-layer neural network including a plurality of neurons at each layer and an interconnect positioned in between each layer of the neural network, according to one or more disclosed example implementations.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

To address implementations of a spiking neural network architecture, the disclosed memristor spiking architecture processor, method, and system represent an improvement to the art of neural network processing (e.g., using a memristor as part of an improved architecture) and other types of multi-stage processing (e.g., image processing). In particular, and not by way of limitation, this disclosure presents implementations of an architecture, system and method to improve the technological field of computer processing by using a memristor component in a manner to achieve accurate spiking capabilities without affecting storage properties of a memristor component due to improper voltage application. For example, in the disclosed architecture the memristor component may be isolated from application of voltages that may disturb a value stored within the memristor component.

Some example implementations of the present disclosure are directed to a memristive multiply accumulate spiking system for vector processing, and related methods and non-transitory computer storage devices. In the implementations described as a non-transitory computer storage device, the storage device may store instructions operable to cause one or more computer processors to perform some or all of the disclosed methods for an asynchronous neural network implementation, for example, using the disclosed memristive spiking neuron architecture. In some implementations, a memristive dot-product system for vector processing (e.g., dot product engine DPE) may benefit from the teachings and architecture of this disclosure. Additionally, different types of processing systems (e.g., a graphics processing unit GPU) may also benefit, and be used, in accordance with disclosed techniques for implementing a spiking architecture utilizing a memristive component in the manner disclosed.

Neural Networks, image processing (e.g., graphics processing), and massively parallel processing on a GPU (e.g., general purpose graphics processing unit GPGPU) are examples of devices and types of processing that may lend themselves to a multi-stage compute process. In general, a multi-stage compute process refers to a computer processing algorithm where outputs from a previous stage (e.g., calculation) may be used as inputs to one or more subsequent stages. That is, each stage builds on the results of the previous stage or stages. In image processing, these stages are sometimes referred to as parts of a graphics "pipeline" while, in neural network implementation, stages may be referred to as layers of the neural network. In any case, the general concept is the same, in that, outputs of previous processing feed inputs (possibly along with other data) of subsequent processing. Accordingly, disclosed techniques of providing a spiking implementation for different processing "phases" or stages may benefit algorithms that work in this multi-stage manner.

For readability of this disclosure, a brief overview of a neural network is provided next. This brief overview is followed by a discussion of architectural considerations (e.g., for a memristor enabled spiking architecture), and then a discussion of possible techniques for implementation of a multi-stage variable precision compute process. Many different architectures of processors may be used to implement the techniques of this disclosure. That is, there may be a processor that includes components representing the disclosed memristor enabled spiking architecture as well as other components that are implemented to work in coordination with the disclosed architecture. In short, processors may be built from many different processing components on a single integrated circuit and may include system on a chip capabilities where different components are built with different base architectures. Thus, the disclosed memristor enabled spiking architecture is used to represent an example of a component of a processor that may also include other functionality and other processing components.

Referring now to FIG. 1A, a neural network 100 is illustrated as layers of interconnecting blocks (each block representing a neuron 110 of a neural network). Neuron 110 is shown larger and with more detail in FIG. 1B. Neural network 100 represents a spiking neural network and is divided into multiple layers (Layer 1, Layer 2, Layer 3, and Layer N). Neural network 100, may also conceptually represent a multi-stage processing flow (e.g., layers representing different stages of a multi-stage process), for example the image processing pipeline presented in FIG. 2 discussed below.

At the top of neural network 100, as illustrated, a set of arrows represents inputs 105 where each neuron may be set up to receive a different set of inputs. Of course, in some implementations a single common input value may be provided to more than one neuron 110. Also, although neuron 110 is illustrated as having four inputs (but any number of inputs is possible), note the ellipses 111 inside neuron 110 indicates that there may be greater than four input values for any neuron 110. As illustrated by the top bracket on the left-hand side of neuron 110 at Layer 1, spike inputs 115 from upstream neurons correspond to each of inputs 105. Each spike input 115 may be applied a weighting factor at block 140 inside neuron 110 and produce a weighted charge packet 120 as illustrated by the middle bracket on the left-hand side of neuron 110 at Layer 1. For example, for a given neuron an input as a result of an upstream spike input 115 may be multiplied by 2, divided by 10, or have an integer weight of 10 added to its value. That is, any mathematical function may be applied to a spike input 115 as part of its weighting inside neuron 110. Of course, different neurons receiving the same initial spike input 115 may weight that spike input value differently based on their individual function within the neural network.

After applying a weight at block 140 and producing a weighted charge packet 120, that weighted charge packet (one from each of weight blocks 140) arrives at block 145 where an accumulator/spike out function may be applied to periodically produce a spike out 125 (see lower bracket on the left-hand side of neuron 110 at Layer 1). The accumulator/spike out function is discussed in more detail below with reference to FIGS. 3-4. Outputs of each neuron 110 then enter an interconnect 130 between layers of the neural network (see bracket between Layer 1 and Layer 2 of neural network 100). As illustrated, a single spike output may be provided, via interconnect 130, from a neuron 110 at Layer 1 of neural network 100 to a neuron 110 at Layer 2 of neural network 100. This may be thought of as an output from a previous layer being provided as an input to the next subsequent layer (or stage in a multi-stage process). For simplicity, neural network 100 is illustrated with inputs flowing only forward to a next layer, however, in some situations there may be a loop-back of results. That is, although not specifically illustrated in neural network 100, a result of Layer 2 (e.g., lower layer) may be an input to Layer 1 (e.g., higher layer) for a subsequent calculation. As used in this example, lower layer may include any layer (or stage of a multi-stage process) processed subsequently and higher layer may include any layer (or stage of a multi-stage process) processed previously with respect to the overall processing function of a neural network 100 (or multi-stage process).

Neural network 100 includes a second interconnect 135 between Layer 2 and Layer 3. In general, there is an interconnect that may be different from other interconnects but exists between each layer of a given neural network as illustrated by ellipses 136. Further, any number of instances of neuron 110 may be implemented at each layer, with different layers possibly having a different number of instances of neuron 110 (see ellipses 137). Finally, at the bottom of neural network 110 outputs 150 are represented by the set of arrows leaving the set of neurons 110 at Layer N of neural network 100. Outputs 150 may represent a result of neural network 100 and corresponding results of the function of neural network 100 and may be presented to a user (e.g., as a result) or provided to another compute function for further processing (including processing outside of a neural network).

With respect to interconnects 130 and 135 between layers of a neural network 100, there are a number of different ways to represent data moving between the layers. In some cases, there could be a digital bus where each interconnect may be 1, 8, 16, etc. number of bits wide to transfer data as an integer, real number, floating point value, etc. In other cases, such as an analog interconnect, each connection may transfer information as a voltage or a current. If a digital interconnect is in place, then a microprocessor could perform processing for weighting and accumulation in digital. When an analog interconnect is used, voltages (or currents) can be added together using electrical circuitry and converted, when necessary, to a digital value using an analog to digital converter (ADC) (not shown). Similarly, a digital to analog converter (DAC) (not shown) could be used to convert from digital to (possibly back to) analog. Many different implementations are possible and different implementations may be used for different portions of a single integrated circuit. In general, an interconnect for a spiking architecture is simpler than a corresponding interconnect for a continuous value neural network because data is only set through the interconnect at the time of a spike rather than continuously. Accordingly, noise (and interference in general such as electrical interference) between different interconnects (e.g., that may be physically close together) may be reduced. Also, accurately duplicating an analog value for distribution to many locations (e.g., via an interconnect 130 or 135) may be avoided.

Figure 1B:
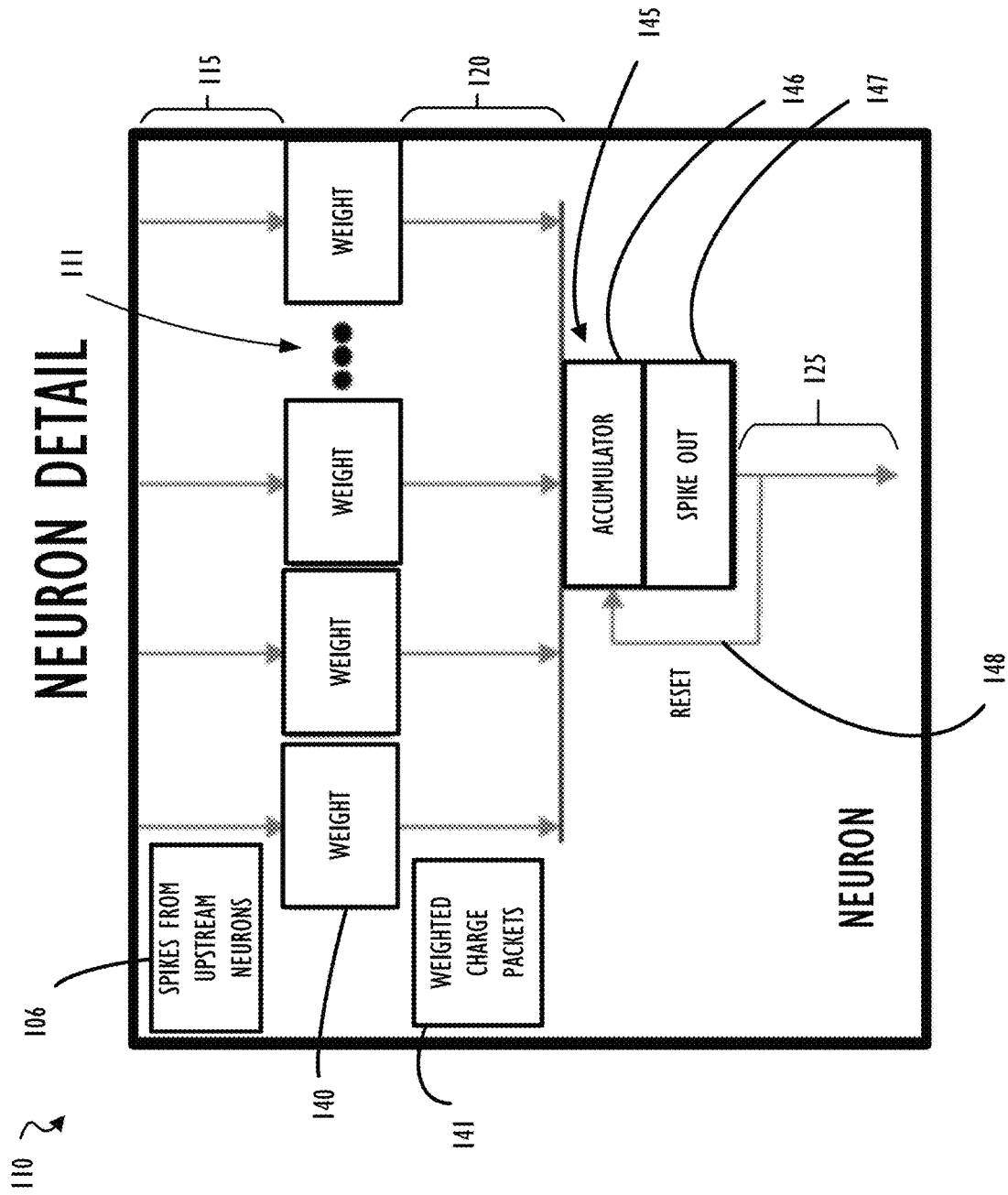
FIG. 1B is a schematic view of an example neuron from the neural network of FIG. 1A enlarged as to disclose details internal to the example neuron, according to one or more disclosed example implementations.

Continuing with reference to FIG. 1B, details of neuron 110 are shown at a larger scale to provide more detail. In general, neuron 110 may perform a multiply accumulate function where inputs are multiplied as part of their weighting 140 and accumulator 146 tracks the total sum of all weighted inputs. As illustrated at block 106, spike input(s) 115 are provided to a weighting function 140. There may be as many different weighting functions 140 as there are spike inputs (or a weighting function 140 may be the same (albeit possibly implemented independently) for two or more inputs). As illustrated at block 141 weight charge packets 120 flow from a weighting function 140 to block 145 where an accumulator 146 and spike out generator 145 may work together to produce a spike out 125. As mentioned above, for a spiking neural network, when a spike is produced by a neuron 110, that neuron may be reset (e.g., accumulator 146 reset to 0 or another base value) as indicated by reset 148 connecting spike out 125 with accumulator 146. In one example implementation, this reset 148 may result in a discharge of a stored value within a capacitor (e.g., via grounding or other drain of that capacitor's stored electrical potential).

The duration of spike out 125 may not be for a very long period of time such that the process of sending the spike out 125 and performing reset 148 may be performed quickly so that accumulator 146 may begin processing newly arriving weighted charge packets 120 without loss. Once a spike out 125 is produced by a neuron 110, all downstream neurons 110 connected, via the interconnect leaving that layer (e.g., interconnect 130 or 135), may receive the same indication that the spiking threshold has been crossed. As mentioned above, this transmission of spike out 125 may be instantaneous (i.e., when it is first detected) or may be delayed till a next clock interval for transmission via the outgoing interconnect. If it is delayed, the reset of accumulator 146 may not be to zero. Instead, the accumulator value may be simply reduced by the threshold value (e.g., current value at transmission clock interval (minus) threshold value) to account for any weighted charge packets 120 that arrived in the interim between crossing the spiking threshold and the next clock interval for transmission.

In summary, at each neuron 110, many spike inputs 115 from upstream neurons come in, get individually weighted at block 140, produce a weighted charge packets 120 that all arrive at accumulator 146. Once accumulator 146 reaches a spiking threshold, a spike out 125 may be generated and the accumulator 146 may be correspondingly reset to begin accumulation for the next spiking threshold. The spike out 125 may be provided to many additional down stream neurons (that may actually be at previous layers). Thus, we have many inputs (e.g., input spikes 115) that to a single spike output 125 that may be fed into many subsequent neuron 110 inputs (e.g., a many to one to many model).

Figure 2:
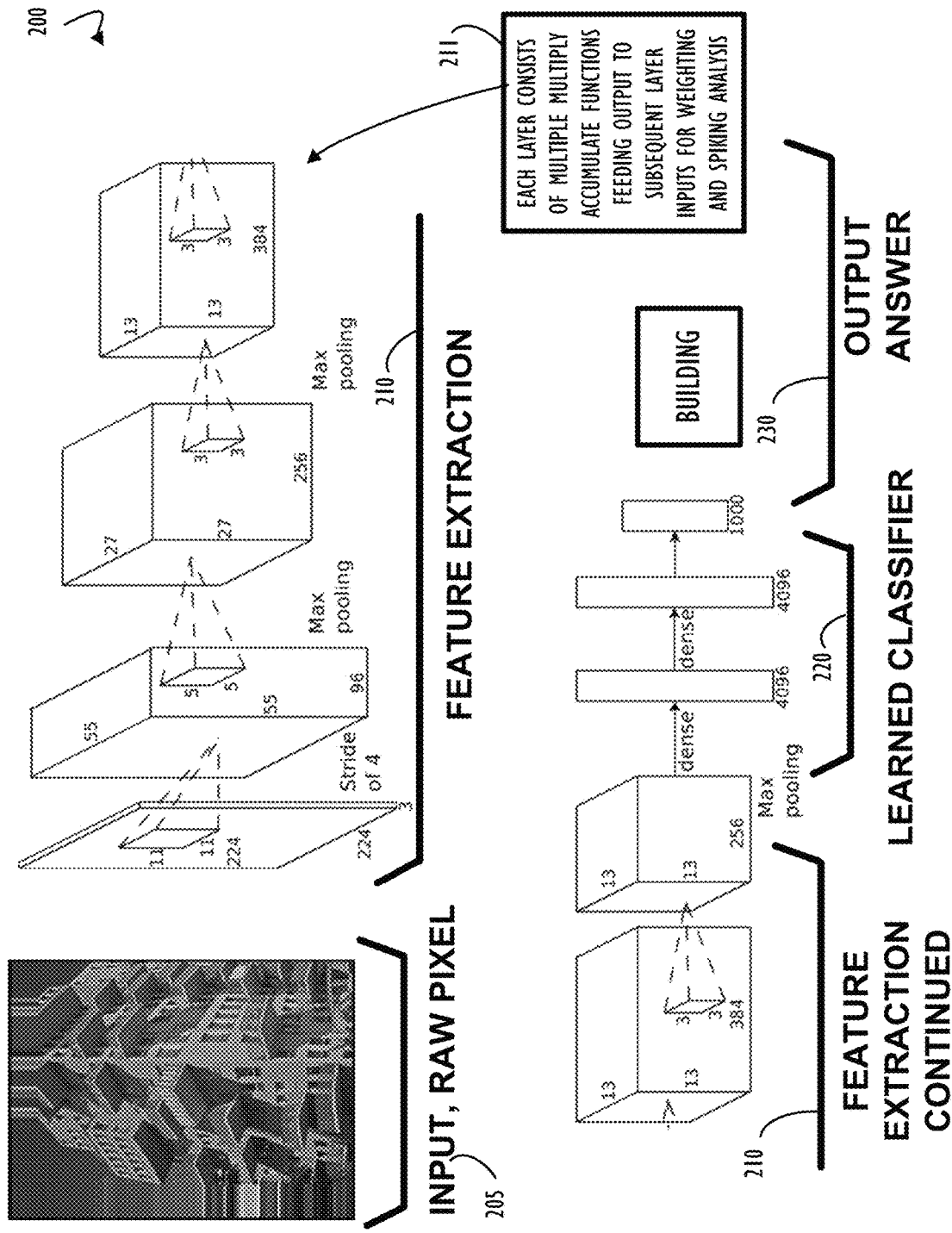
FIG. 2 represents an image processing pipeline that is conceptually similar to a neural network in that layers of processing (e.g., stages of the pipeline) produce outputs that may be used as input to the next layer, according to one or more disclosed example implementations.

Referring to FIG. 2, the disclosed approach to a memristor spiking architecture may be applicable to processing applications in addition to neural networks. For example, a multi-stage processes such as an image processing process 200 with multiple steps where different steps in the image processing feed inputs to subsequent processing. According to some disclosed implementations, Image processing pipeline process 200 represents an example of a set of related computational stages that may work together (in series or in parallel) to produce an overall result. In the image processing example, the process may begin with input of raw pixel data 205. After the raw pixel data 205 is obtained, a feature extraction process 210 may be performed to determine attributes of the image being processed. As illustrated in image processing pipeline process 200, the feature extraction process may include a number of different calculations (e.g., convolutions, correlations, linear transforms, etc.), perhaps on different portions of the input image, and result in an overall set of features extracted from the input image. After feature extraction 210 is completed, a learned classifier process 220 may be performed. As in this example and illustrated by block 211, learned classifier process 220 may be performed using a variety of multiply accumulate calculations similar to multiply accumulate functions performed during feature extraction 210. Finally, an output answer 230 may be calculated (again using multiply accumulate and spiking functions). Thus, processing requirements of the overall graphics pipeline (e.g., image processing pipeline process 200) may be similar to the processing described above for neural network 100 and may represent another example where the disclosed memristor spiking architecture of a multiply accumulate circuit may provide a benefit.

Figure 3:
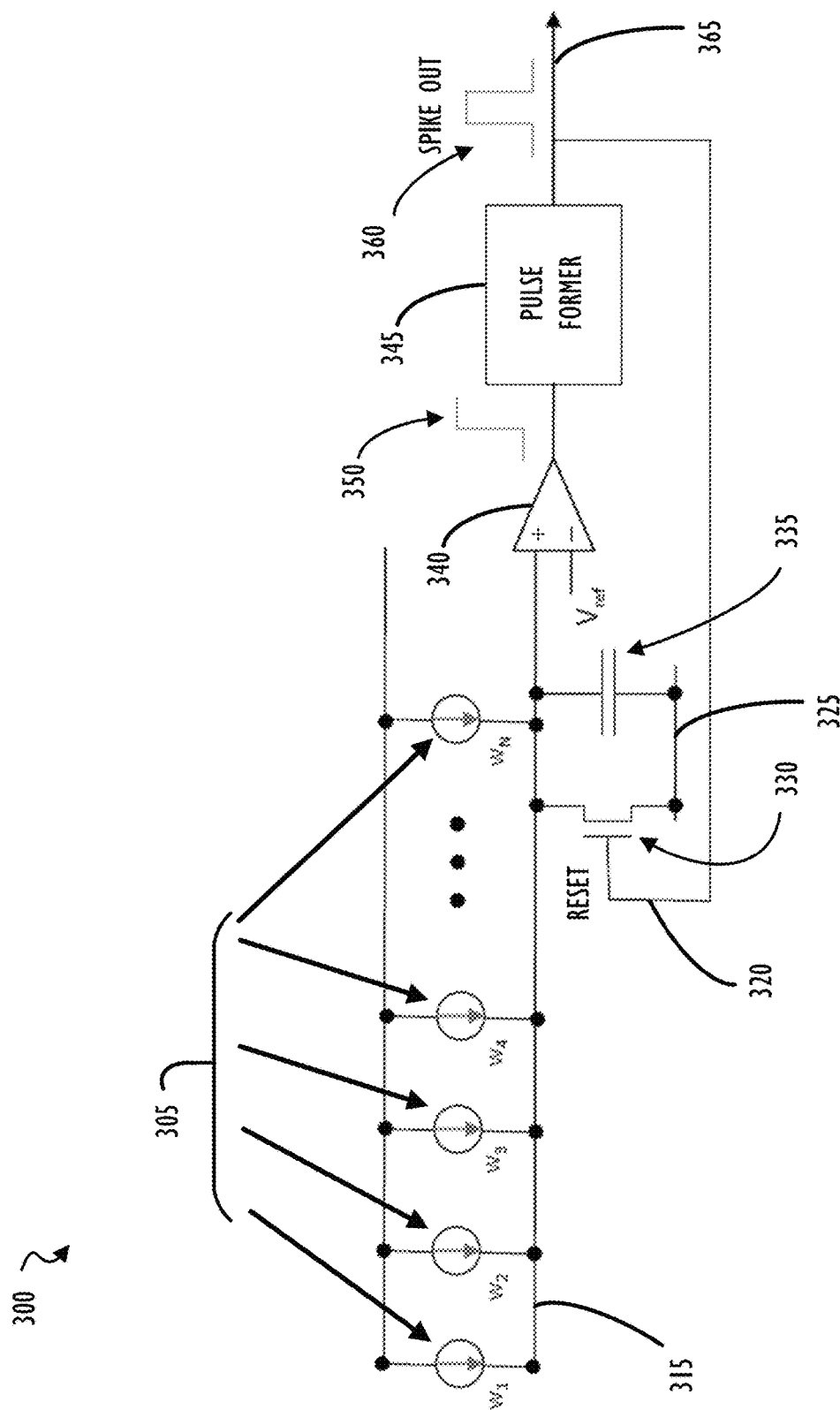
FIG. 3 is an electrical diagram illustrating, at a conceptual level, possible circuitry used to form internals of the example neuron of FIG. 1B to produce a spiking neuron of a spiking neural, according to one or more disclosed example implementations.

Referring now to FIG. 3, circuit diagram 300 illustrates at a high-level (e.g., conceptual level) a circuit that may exist as part of a neuron 110 (See FIG. 1A) to perform an asynchronous spiking neural network using a memristor, according to one or more disclosed embodiments. As noted, circuit diagram 300 is at a high conceptual level and any actual implementation is expected to vary in detail but conform to the overall architecture as explained in this disclosure.

In circuit diagram 300, pulse weighting circuit 305 (discussed in more detail below with reference to FIG. 4) produces weighted charge packets similar to those discussed above (e.g., weighted charge packets 120 of FIG. 1). Each of the weighted charge packets is indicated as $W_1$ through $W_N$ in circuit diagram 300. Each weighted charge packet may arrive asynchronously (e.g., triggered from upstream spiking neurons) with respect to each other as discrete charge packets. In the example represented by circuit diagram 300, multiplication may be used as the weighting function performed by weighting circuit 305. Each of the N current output circuits (e.g., $W_N$) are outputting a charge packet that accumulates on capacitor 335 (via conductor 315). Thus, capacitor 335 is performing the accumulate function of this example multiply accumulate circuit. Once the charge on capacitor 335 reaches a threshold value ($V_{ref}$) as a result of accumulation of these charge packets ($W_1$ through $W_N$), that triggers comparator 340 to produce a rising edge signal 350 to pulse former 345. The rising edge signal 350 of the comparator 340 output causes the pulse former 345 to output a pulse (i.e., spike out signal 360). Spike out signal 360 resets the accumulation capacitor 335 back to 0 volts (see conductor 320). Also, spike out signal 360 may continue (see conductor 365) as a spike that may be sent to multiple downstream neurons. For example, upon receiving rising edge signal 350 at pulse former 345, a spike out signal 360 may be created that that exists via conductor 365. When spike out signal 360 exits, that triggers a reset via conductor 320 and reset transistor 330. Conductor 325 is connected to capacitor 335 to perform a drain (reset) of capacitor when the reset (based on the spike out signal) is initiated. Thus, the accumulator function performed by capacitor 335 may begin again for the next appropriate output spike.

Figure 4:
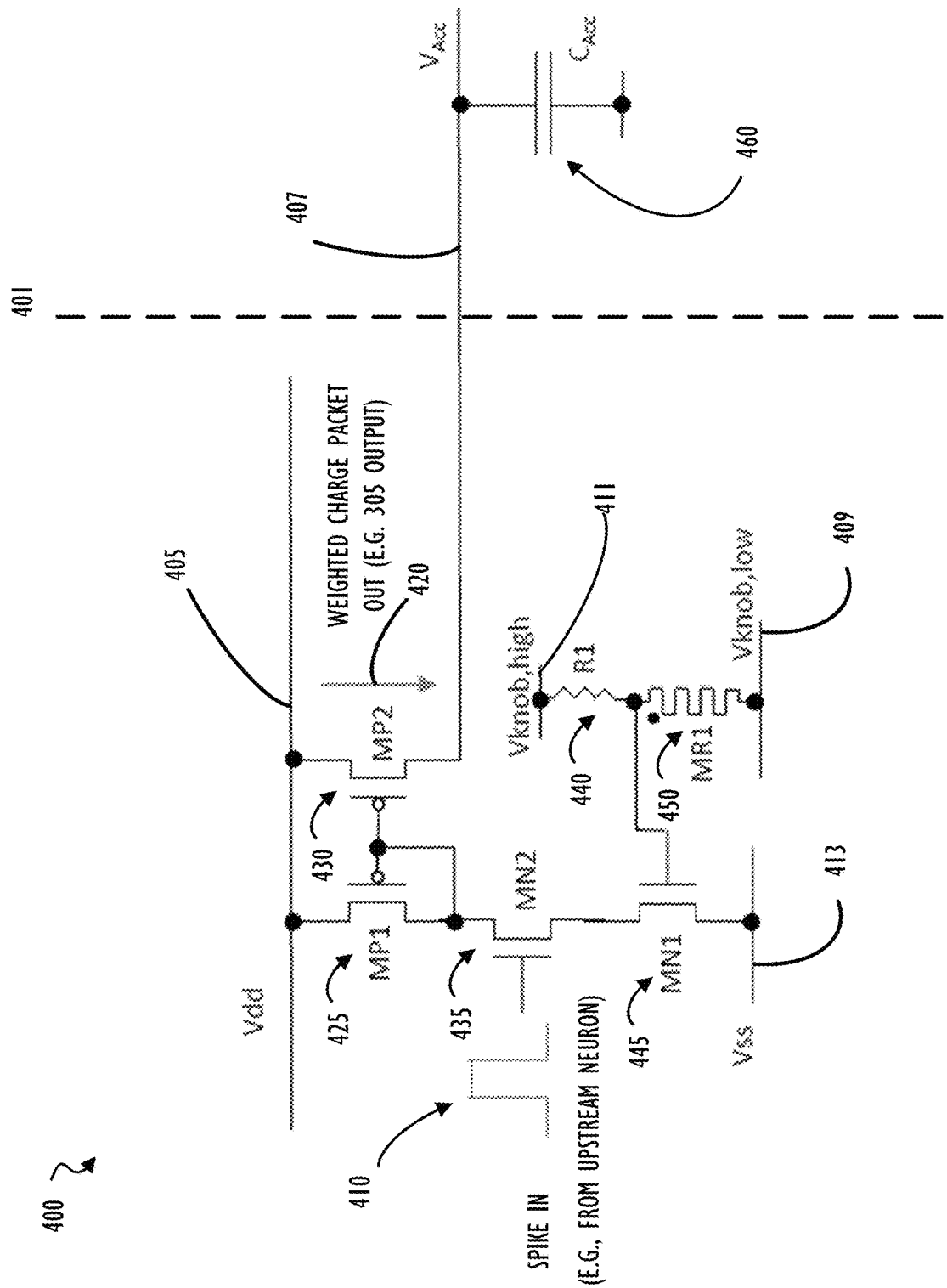
FIG. 4 is an electrical diagram illustrating, at a conceptual level, possible circuitry from a portion of the circuit of FIG. 3 including a memristor component to receive and produce spikes from a neuron of a neural network, according to one or more disclosed example implementations.

Referring now to FIG. 4, circuit diagram 4 illustrates at a high-level (e.g., conceptual level) a circuit that may exist as part of a pulse weighting circuit 305 of FIG. 3 to perform an asynchronous spiking neural network using a memristor, according to one or more disclosed embodiments. As noted, circuit diagram 400 is also at a high conceptual level and any actual implementation is expected to vary in detail but conform to the overall architecture as explained in this disclosure. The left-hand portion of circuit diagram 400 (i.e., to the left of reference dashed line 401) represents components that may be included, for example, in a weighting circuit 305 of FIG. 3. Capacitor 460 represents a second example of an accumulator capacitor such as capacitor 335 of FIG. 3.

Several options exist for creating the weighted charge packet (e.g., 120 of FIG. 1) from an input spike (e.g., 115 of FIG. 1). The schematic illustrated in circuit diagram 400 represents one example of using a memristor 450 to accomplish this function, according to some disclosed implementations. In this example, MN1 445 and MN2 435 are N channel MOSFETs; MP1 425 and MP2 430 are P channel MOSFETs. A MOSFET is a metal-oxide-semiconductor field-effect transistor. Conductor 407 represents how charge packets 420 (e.g., 120 of FIG. 1 and output of weighting circuit 305 of FIG. 3) arrive at accumulator capacitor 460. Conductor 405 represents Voltage Drain-to-Drain (Vdd) and conductor 413 represents Vss (source). In the example of FIG. 4, spike in pulse 410 is similar to spikes from upstream neurons 115 discussed for FIG. 1 and arrives at the weighting function applied by this example circuit at MN2 435.

In the schematic of circuit diagram 400, resistor R1 440 and memristor MR1 450 form a voltage divider that may be used to select an output voltage between $V_{knob,high}$ at conductor 411 and $V_{knob,low}$ at conductor 409. $V_{knob,high}$ and $V_{knob,low}$ may represent global supply. Continuing with this example, the fixed Vgs (gate-source voltage) on MN1 445 sets the current that flows through MN1 445 when it is in saturation. MN2 435 may be operated as a switch and is on only for the duration of each input spike. In some implementations, MN2 435 would be a PFET and the spike in pulse 410 would have the opposite polarity, however, an NFET and a positive polarity pulse are illustrated here to simplify the concepts. When MN2 435 is on, the drain voltage of MN1 425 will be the correct Vgs voltage for MP1 425 to conduct the identical current set by MN1 445. Accordingly, MP2 430 mirrors the current of MP1 425 and this mirror current flows for the duration of the spike pulse 410. The current through MP2 430 times its duration equals the total charge injected into accumulator capacitor 460.

To explain further, a current mirror has an input half and an output half. In this example, MP1 425 represents the input half and MP2 430 represents the output half. The current flowing through MP1 425, in this example, may be pulled out by devices MN2 435 and MN1 445 that are represented below MP1 425. If we have a current A flowing through MP2 430, as long as MP2 430 is in saturation, that same amount of current (i.e., A) that is going through MP1 425 will also flow through MP2 430. This is because, in this example, both MP1 425 and MP2 430 may have the same gate voltage and may be set up so they are both in saturation and thus function as a current mirror. Current mirrors typically have a very high output resistance that results in their current being very steady regardless of the voltage on the drain. There are different types of current mirrors and a designer may select an appropriate implementation of a current mirror based on design requirements (e.g., amount of voltage head space, etc.).

As stated above, variations to this schematic are possible without deviating from the scope of this disclosure. For example, R1 440 could be replaced with another memristor (similar to MR1 450) and have the effect of doubling the range of the voltage divider's output. R1 440 could be replaced with the output of a current mirror, where the current mirror's input field-effect transistor (FET) shares its Vgs output with all (or some) other R1-replacing current mirrors across one or more neurons. For example, this may provide a coarse knob for tuning all (or some) of this neuron's weights together (or in groups). Other modifications may also be possible. In any implementation, the example circuit may have a voltage divider and program memristor MR1 450 in such a way that there is a particular voltage on the gate of MN1 445. That particular voltage causes a particular current through MN1 445. In cases where a higher current is desired, MN1 445 could have a higher gate voltage and MR1 450 could be adjusted accordingly. In cases where a lower current is desired, MN1 445 could have a lower gate voltage and MR1 450 could similarly be adjusted (e.g., via programming of the memristor). Every time a pulse arrives (e.g., spike in 410), a weighted charge packet 420, that is a function of the current that flows through MN1 445, is generated and sent to the accumulation capacitor 460. Spikes arrive at MN2 435, which in this example may be acting like a switch such that when its gate voltage is low, it is off and when voltage is high it is shorted together (i.e., for the duration of the spike in 410). Accordingly, for the duration of the spike in 410, the current that flows through MN1 445 is also going to flow through MP1 425 and be mirrored through the current mirror output of MP2 430 to produce weighted charge packet out 420 and supply a charge to capacitor accumulator 460. Although not illustrated, negative weights, which remove charge packets from the accumulation capacitor can be implemented in a similar manner.

Memristors, such as MR1 450, are programmed by applying a voltage higher than a threshold voltage to set a value. After programming, a memristor will maintain that initial programmed value until being reset by another voltage higher than the programming voltage. In some implementations of multiply accumulate circuits that differ from the example of FIG. 4, this may represent a problem. That is, some implementations apply an input voltage directly onto the memristor itself and if the input signal changes, the resistance on the memristor may be reset or inadvertently altered (for example by a small value each time any voltage is applied and deteriorate over time); this is known as a 'disturb' condition. Further, memristor resistance may be a non-linear function of the applied input voltage. These conditions may create a certain amount of error that in turn may be added to each of the multiplications used for the multiply accumulate function. In the example of FIG. 4, there is no input dependent voltage applied to memristor MR1 450 as it is isolated from input spike 410 and thus the circuit of FIG. 4 is not affected by the non-linear issue with applying different inputs across the memristor. Accordingly, the value of MR1 450 will not change as a function of the changing input. Similarly, the voltage-divider type of memristor read used in this example avoids the signal to noise (SNR) issue caused by scaled reduction of all input voltages such that the largest input voltage does not exceed the memristor disturb voltage (i.e., signal reduction with no change in noise) of analog multiply accumulate circuits with the input voltage applied directly to the memristor itself because, in the example of FIG. 4, the input signal does not run through the memristor (e.g., MR 450).

In some implementations, a memristor component (e.g., MR 450) and the voltage divider it creates may be replaced with anything that will provide a bias voltage to MN1 445. For example, a programmable resistance (by something other than a memristor), a laser trimmed or mask programmable resistance, a digital to analog converter, etc. In this case, there would continue to be a charge packet applied to the accumulator capacitor 460 and other components may work as described above to perform the spike out and reset functionality.

In other implementations, or in combination with the above described implementations, there may be components to provide a current sink/source that continually charge or discharge the accumulator capacitor 460 with relatively small currents. These small currents may also act as a long-time damper on the accumulated charge. That is, the charge may leak off the accumulator capacitor 460 over a time window if there are not enough spikes arriving at the neuron within that time window. In one example of such a circuit, a modification to the circuit of FIG. 4 may be made. For example, one modification would be to remove MN2, and tie MN1's and MP1's drains together. This portion of the modification would continuously provide source current onto the accumulator capacitor 460 until it was fully charged (if negative-weighted spikes didn't come in quickly enough over the above-mentioned time window). Alternatively, there could be a circuit designed to work with positive-weighted spikes. For example, this circuit for positive-weighted spikes may be designed to provide a continuous current sink (which would continuously sink current from the accumulator capacitor 460 until it was fully discharged if positive-weighted spikes didn't come in fast enough over the above-mentioned time window). For this second example, a modification to the circuit of FIG. 4 would be to remove MN2, replace all the NFETs with PFETs and replace all PFETs with NFETs; and swap Vdd and Vss. This second modification may be thought of as basically a 'flip' of the circuit of FIG. 4 so that the current mirror is on the bottom. Each of these examples illustrate the types of modifications that may be made to achieve the described results, other modifications are also possible without departing from the scope of this disclosure. To be clear, a combination of the above circuit implementations may exist in a single overall implementation of a multi-stage processor to support the above described application models.

Figure 5:
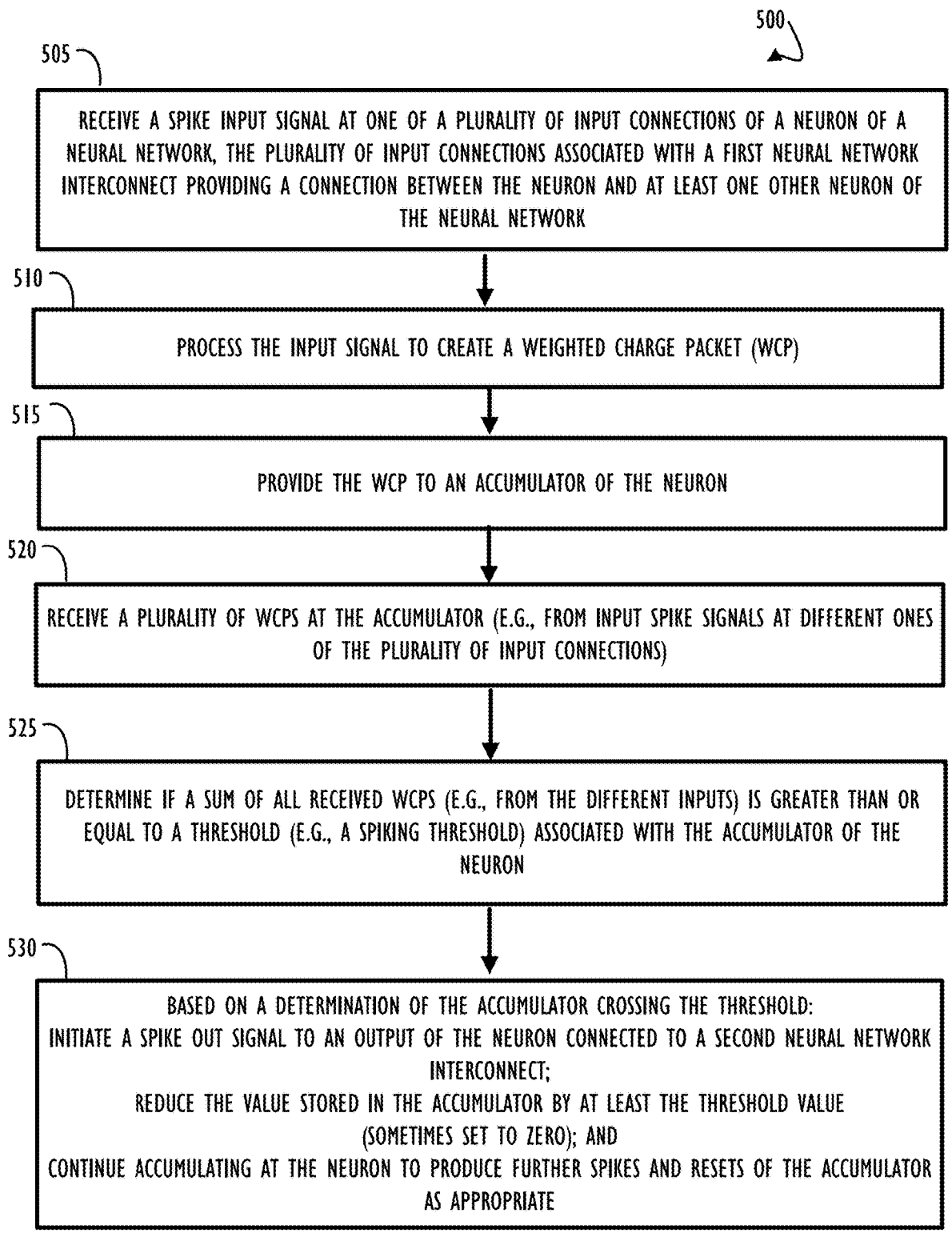
FIG. 5 illustrates a flowchart of an example method of performing a multiply accumulate function for a spiking architecture using a memristor component (e.g., as in FIGS. 2 and 3) that may be used as part of a system implemented to perform a multi-stage compute process, according to one or more disclosed example implementations.

FIG. 5 illustrates a flowchart 500 of an example method of performing asynchronous spiking processing for different stages of a multi-stage compute process, for example, using a memristor multiply accumulate circuit, according to one or more disclosed example implementations. FIG. 5 represents an example method that may be executed on a computing device having multiple hardware processors. For example, a processor (e.g., general purpose processor), a DPE that may be used as an accelerator for matrix multiplication, and a memristor enabled spiking neuron processing unit, according to one or more disclosed example implementations. For example, method 500 may be used as part of a digital image processing pipeline as discussed above in FIG. 3. In that example, method 500 may be repeated multiple times for each "phase" of the processing at different stages of the pipeline. As another example, method 500 may be used as part of an asynchronous neural network spiking architecture for machine learning or other processing techniques.

Flowchart 500 begins at block 505 where a spike input signal may be received at one of a plurality of input connections for a neuron of a neural network. For example, neuron 110 of FIG. 1 has multiple upstream spike inputs 115 and an input signal may be received asynchronously at any one of these inputs. As illustrated in FIG. 1 each of the inputs to a single neuron may arrive at the neuron input via a neural network interconnect (sometimes referred to as an interconnect fabric) such as interconnects 130 or 135 of FIG. 1. As also illustrated in FIG. 1, interconnects provide data communication connections between neurons at different layers (not necessarily adjacent) of a neural network.

Block 510 illustrates that the input signal may be processed to create a weighted charge packet (WCP). For example, as illustrated in FIGS. 3 and 4, an input signal may be weighted at a multiply function of a multiply accumulate processor to produce the WCP. Block 515 indicates that each of the WCPs from this or other inputs (after weighting) of the neuron (e.g., neuron 110) may arrive at the accumulator. For example, WCPs may be provided to capacitor accumulator 460 of FIG. 4. Block 520 indicates that the accumulator collects these multiple WCPs. Block 525 indicates that the accumulator (and possibly other processing) may determine that the sum of all received WCPs is greater than or equal to a threshold value. For example, if the accumulator has reached the defined spiking threshold of the neuron. In some cases, this may be implemented with a capacitor accumulator programmed to hold an electrical charge as in FIG. 4.

Once a spiking threshold has been reached for a neuron, several events may occur to produce a spike output from the neuron as indicated by block 530. For example, a spike out signal to an output of the neuron may be produced. This spike output may be provided to a single output of the neuron (e.g., spike out 125 of FIG. 1 or conductor 365 of FIG. 3). The output of a neuron may then enter the interconnect and be provided as input to one or more downstream neurons. Also based on the spike out signal being generated, the value stored in the accumulator of the neuron may be reduced. In some cases, the accumulator is simply set to 0 while in other cases the accumulator may only be reduced by a value equal to the spiking threshold. In the case where the accumulator is reduced only by a threshold amount, there may be a remainder maintained in the accumulator to indicate the amount of overage that was present at the time of crossing the spiking threshold. That is, if the accumulator went from 99 to 110 based on arrival of a WCP and the spiking threshold was 100, the reset function of the accumulator may set it to a value of 10 rather than 0. Finally, block 530 indicates that the accumulator and neuron may continue this function for future arriving WCPs, producing spikes and performing resets of the accumulator as necessary. Thus, in the example of flowchart 500, a plurality of layers of multiple neurons representing a spiking asynchronous neural network may be implemented.

Figure 6:
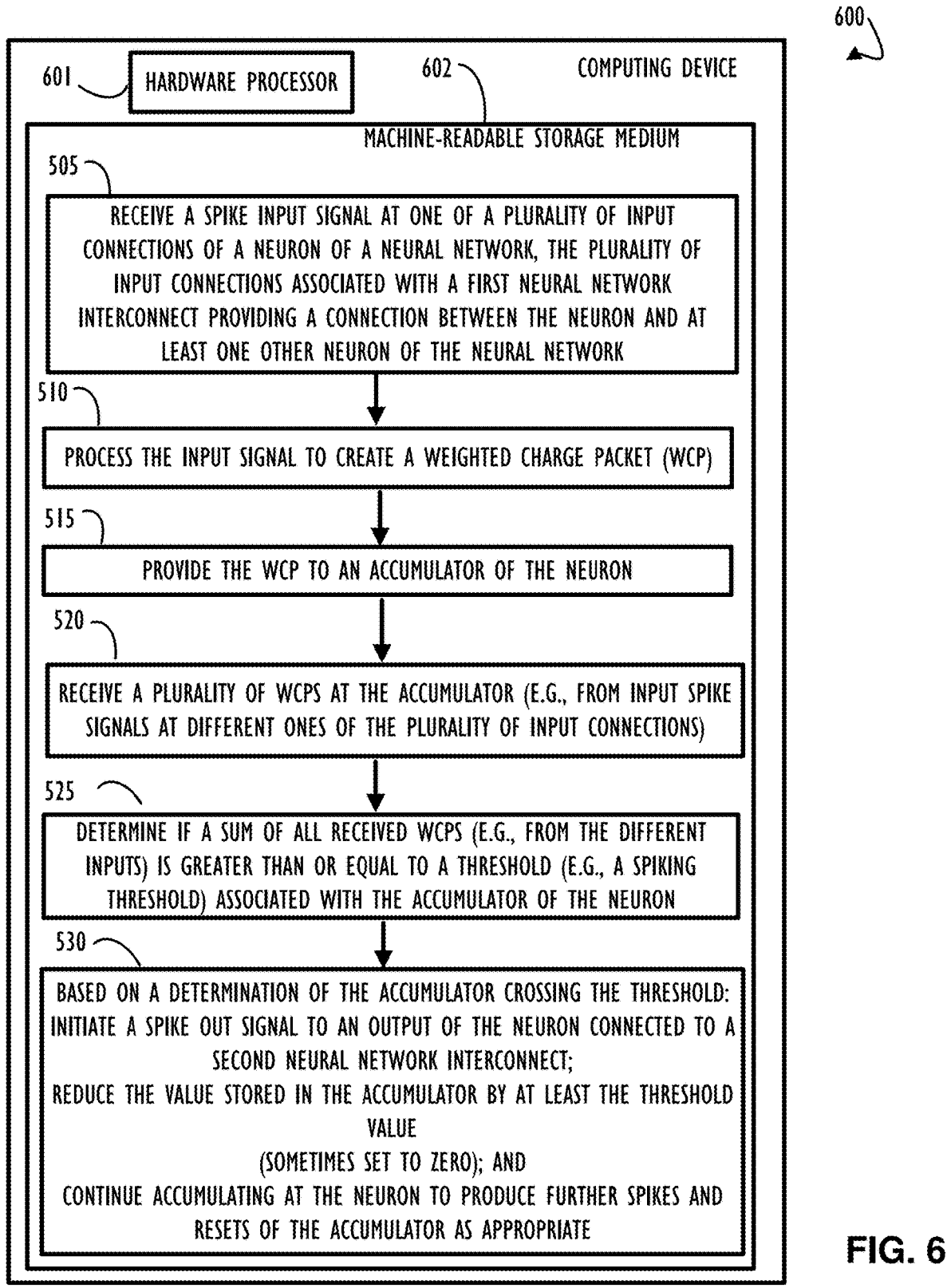
FIG. 6 is an example computing device with a hardware processor and accessible machine-readable storage medium storing instructions for performing stages of a multi-stage compute process, according to one or more disclosed example implementations.

FIG. 6 is an example computing device 600, with a hardware processor 601, and accessible machine-readable instructions stored on a machine-readable medium 602 for performing stages of a multi-stage compute process such as image processing or an asynchronous spiking neural network, according to one or more disclosed example implementations. FIG. 6 illustrates computing device 600 configured to perform the flow of flowchart 500 as an example. However, computing device 600 may also be configured to perform the flow of flowchart 500 in coordination with other methods, techniques, functions, or processes described in this disclosure. In this example of FIG. 6, machine-readable storage medium 602 includes instructions to cause hardware processor 601 to perform blocks 505-530 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
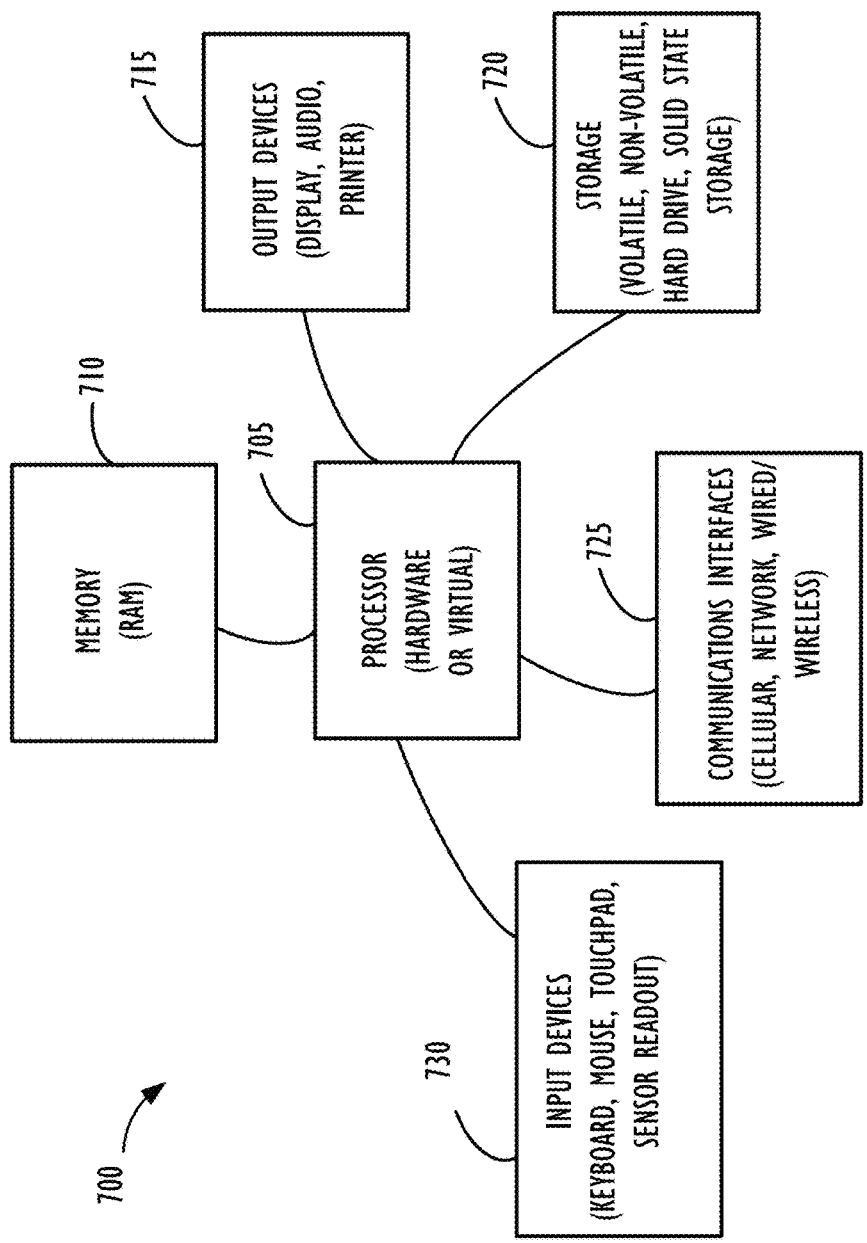
FIG. 7 illustrates a computing device that may be used to implement the functions, modules, processing platforms, execution platforms, communication devices, and other methods and processes of this disclosure.

FIG. 7 illustrates a computing device 700 that may be used to implement the functions, modules, processing platforms, execution platforms, communication devices, and other methods and processes of this disclosure. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware.

As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display).

Computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 7, computing device 700 includes a processing element such as processor 705 that contains one or more hardware processors, where each hardware processor may have a single or multiple processor cores. In one embodiment, the processor 705 may include one or more memristor components as illustrated in FIGS. 3 and 4, discussed above to implement a spiking architecture for a process executing on computing device 700. Also, processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 7, the processing elements that make up processor 705 may also include one or more of other types of hardware processing components, such as graphics processing units (GPU), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more storage devices 720 that comprise a non-volatile storage device and/or volatile memory. Volatile memory, such as random-access memory (RAM), can be any suitable non-permanent storage device. The non-volatile storage devices 720 can include one or more disk drives, optical drives, solid-state drives (SSDs), tap drives, flash memory, read only memory (ROM), and/or any other type of memory designed to maintain data for a duration of time after a power loss or shut down operation. For example, machine-readable storage medium 602 of FIG. 6. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one embodiment, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage device 720 (or machine-readable storage medium 602 of FIG. 6), from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 700 may comprise other components well known in the art, such as sensors, powers sources, and/or analog-to-digital converters, not explicitly shown in FIG. 7.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

We claim:

1. A circuit comprising:
    a weighted charge packet generator;
    an accumulator capacitor having a first terminal and a second terminal, wherein the first terminal is electrically coupled to the weighted charge packet generator via a conductor;
    a comparator electronically connected to the first terminal of the accumulator capacitor to monitor a stored charge on the accumulator capacitor;
    a pulse former having an input electrically connected to an output of the comparator; and
    a reset transistor including a gate, a drain terminal, and a source terminal, wherein the gate is connected to an output of the pulse former, the drain terminal is connected to the second terminal of the accumulator capacitor, and the source terminal is connected to the conductor, wherein:
        the weighted charge packet generator produces charge packets to alter the stored charge on the accumulator capacitor;
        the comparator provides an input signal to the pulse former upon the accumulator capacitor reaching a pre-determined value for the stored charge; and
        based on the input signal from the comparator, the pulse former produces a spike output signal to exit the circuit and provide an input to the reset transistor to reduce the stored charge on the accumulator capacitor.

2. The circuit of claim 1, further comprising:
    a plurality of weighted charge packet generators, each of the plurality of weighted charge packet generators electrically connected to a respective separate input signal.

3. The circuit of claim 2, wherein each respective separate input signal represents an input signal from a neuron of a processor of a multi-stage compute process.

4. The circuit of claim 3, wherein at least a portion of the plurality of weighted charge packet generators asynchronously receive a number of second input signals from a plurality of neurons at different layers of a neural network.

5. The circuit of claim 2, wherein a portion of the plurality of weighted charge packet generators produce a charge packet to decrease the stored charge.

6. The circuit of claim 2, wherein each of the plurality of weighted charge packet generators produce a charge packet to increase the stored charge.

7. The circuit of claim 1, wherein the reset transistor to reduce the stored charge on the accumulator capacitor reduces the stored charge on the accumulator capacitor by an amount equal to the pre-determined value for the stored charge leaving a charge greater than zero on the accumulator capacitor.

8. The circuit of claim 1, wherein the reset transistor to reduce the stored charge on the accumulator capacitor drains all stored charge on the accumulator capacitor.

9. The circuit of claim 1, wherein the weighted charge packet generator comprises:
    a voltage divider comprising:
        a first memristor;
        a first N channel metal-oxide-semiconductor field-effect transistor (MOSFET) electrically connected to the first memristor; and
        a resistor electrically connected to the first memristor, wherein programming the first memristor with a conductance sets a voltage for the voltage divider supplied to a gate of the first N channel MOSFET;
    a current mirror comprising:
        an input half including a first P channel MOSFET; and
        an output half including a second P channel MOSFET; and
    a second N channel MOSFET electrically connecting the input half of the current mirror to the first N channel MOSFET, wherein when a spike in signal having a positive polarity arrives at a gate of the second N channel MOSFET, the spike in signal enables electrical connection of the first P channel MOSFET to the first N channel MOSFET for a duration of the spike in signal,
    wherein the arrival of the spike in signal causes the output half of the current mirror to produce the weighted charge packet by mirroring a first current through the first P channel MOSFET as an equal second current through the second P channel MOSFET for the duration of the spike in signal, the weighted charge packet having a total charge equal to the current through the second P channel MOSFET times the duration of the spike in signal.

10. The circuit of claim 9, wherein the second N channel MOSFET is replaced with a P channel field-effect transformer (FET) and the spike in signal has a negative polarity.

11. The circuit of claim 9, wherein the resistor is second memristor, which increases a range of output available for the voltage divider.

12. The circuit of claim 9, wherein changing the conductance of the first memristor from a first conductance to a second conductance, via programming the first memristor by applying a voltage to the memristor greater than a disturb voltage of the first memristor, adjusts the production of weighted charge packets based on a change in current supplied by the first N channel MOSFET as a result of the second conductance.

13. A circuit comprising:
   a weighted charge packet generator comprising a first transistor, a second transistor, and a memristor;
   an accumulator capacitor having a first terminal and a second terminal, wherein the first terminal is electrically coupled to the weighted charge packet generator via a conductor;
   a comparator electronically connected to the first terminal of the accumulator capacitor to monitor a stored charge on the accumulator capacitor;
   a pulse former having an input electrically connected to an output of the comparator; and
   a reset transistor including a gate, a drain terminal, and a source terminal, wherein the gate is connected to an output of the pulse former, the drain terminal is connected to the second terminal of the accumulator capacitor, and the source terminal is connected to the conductor,
   wherein the first transistor having a drain terminal connected to a source terminal of the second transistor; and
   the memristor is connected to a gate of the first transistor and isolated from a spike in signal applied to a gate of the second transistor.

14. The circuit of claim 13, further comprising:
   a plurality of weighted charge packet generators, each of the plurality of weighted charge packet generators electrically connected to a respective separate input signal.

15. The circuit of claim 14, wherein each respective separate input signal represents an input signal from a neuron of a processor of a multi-stage compute process.

16. The circuit of claim 15, wherein at least a portion of the plurality of weighted charge packet generators asynchronously receive a number of second input signals from a plurality of neurons at different layers of a neural network.

17. The circuit of claim 14, wherein a portion of the plurality of weighted charge packet generators produce a charge packet to decrease the stored charge.

18. The circuit of claim 14, wherein each of the plurality of weighted charge packet generators produce a charge packet to increase the stored charge.

19. The circuit of claim 13, wherein the reset transistor to reduce the stored charge on the accumulator capacitor drains all stored charge on the accumulator capacitor.

20. The circuit of claim 13, wherein the weighted charge packet generator further comprises:
   a voltage divider comprising:
      the memristor;
      the first transistor; and
      a resistor electrically connected to the memristor, wherein programming the memristor with a conductance sets a voltage for the voltage divider supplied to the gate of the first transistor;
   a current mirror comprising:
      an input half including a third transistor; and
      an output half including a fourth transistor,
   wherein the second transistor electrically connecting the input half of the current mirror to the first transistor, wherein when the spike in signal having a positive polarity arrives at the gate of the second transistor, the spike in signal enables electrical connection of the third transistor to the first transistor for a duration of the spike in signal,
   wherein the arrival of the spike in signal causes the output half of the current mirror to produce a weighted charge packet by mirroring a first current through the third transistor as an equal second current through the fourth transistor for the duration of the spike in signal, the weighted charge packet having a total charge equal to the current through the fourth transistor times the duration of the spike in signal.

* * * * *